United States Patent
Jeon et al.

(10) Patent No.: US 11,561,441 B2
(45) Date of Patent: Jan. 24, 2023

(54) DISPLAY APPARATUS INCLUDING A PLURALITY OF DISPLAY PANELS, AND METHOD OF CONTROLLING THEREOF

(71) Applicant: SAMSUNG ELECTRONICS CO., LTD., Suwon-si (KR)

(72) Inventors: Kangwon Jeon, Suwon-si (KR); Younggeol Kim, Suwon-si (KR); Jaehee Kwak, Suwon-si (KR); Kwangdon Kim, Suwon-si (KR); Youngjin Yoon, Suwon-si (KR); Jaesung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 17/117,459

(22) Filed: Dec. 10, 2020

(65) Prior Publication Data
US 2021/0174752 A1    Jun. 10, 2021

(30) Foreign Application Priority Data

Dec. 10, 2019   (KR) .................. 10-2019-0164093
Nov. 24, 2020   (KR) .................. 10-2020-0158868

(51) Int. Cl.
*G02F 1/1347*    (2006.01)
*G02F 1/1335*    (2006.01)
(Continued)

(52) U.S. Cl.
CPC ........... *G02F 1/1347* (2013.01); *G02B 30/52* (2020.01); *G02F 1/13362* (2013.01);
(Continued)

(58) Field of Classification Search
CPC ............. G02F 1/1347; G02F 1/133514; G02F 1/13362; G02F 1/133621; G02B 30/52;
(Continued)

(56) References Cited

U.S. PATENT DOCUMENTS 5,745,197 A    4/1998   Leung et al.
8,651,678 B2   2/2014   Lanman et al.
(Continued)

FOREIGN PATENT DOCUMENTS

JP    2000-298273 A    10/2000
JP    2004-117652 A     4/2004
(Continued)

OTHER PUBLICATIONS

Douglas Lanman et al., "Polarization Fields: Dynamic Light Display using Multi-Layer LCDs", Association for Computing Machinery, pp. 1-9 (10 pages total).
(Continued)

*Primary Examiner* — Xuemei Zheng
(74) *Attorney, Agent, or Firm* — Sughrue Mion, PLLC

(57) ABSTRACT

A display apparatus is disclosed. The display apparatus includes a backlight configured to emit light; a first polarizing plate, disposed in front of the backlight, configured to polarize light emitted from the backlight in a first direction; and a plurality of display panels sequentially disposed in front of the first polarizing plate, wherein each of the plurality of display panels is configured to include a liquid crystal panel and a color filter disposed in front of the liquid crystal panel, and wherein a display panel disposed at a farthest distance from the first polarizing plate from among the plurality of display panels is configured to include a second polarizing plate that polarizes the light of the first direction in a second direction.

7 Claims, 13 Drawing Sheets

(51) Int. Cl.
  *G02B 30/52* (2020.01)
  *G09G 3/36* (2006.01)
  *G09G 3/34* (2006.01)
  *G02F 1/13357* (2006.01)

(52) U.S. Cl.
  CPC .. *G02F 1/133514* (2013.01); *G02F 1/133621* (2013.01); *G09G 3/3413* (2013.01); *G09G 3/3607* (2013.01); *G02F 2203/30* (2013.01); *G09G 2300/023* (2013.01); *G09G 2310/08* (2013.01)

(58) Field of Classification Search
  CPC ...... G02B 27/0101; G06T 15/08; G09G 3/36; G09G 3/003; G09G 3/3406; G09G 3/3413; G09G 2300/023; G09G 3/3607; H04N 13/395; H04N 13/122; H04N 13/128; H04N 13/275
  See application file for complete search history.

(56) References Cited

U.S. PATENT DOCUMENTS

| | | | |
|---|---|---|---|
| 8,848,006 | B2 | 9/2014 | Wetzstein et al. |
| 9,864,243 | B2 | 1/2018 | Erinjippurath et al. |
| 10,431,166 | B2* | 10/2019 | Wasinger ................. G09G 3/36 |
| 2005/0146787 | A1 | 7/2005 | Lukyanitsa |
| 2006/0033865 | A1 | 2/2006 | Tanaka et al. |
| 2009/0027323 | A1* | 1/2009 | Choi ................... G02F 1/13471 345/88 |
| 2009/0059103 | A1 | 3/2009 | Azor et al. |
| 2010/0128034 | A1* | 5/2010 | Han ....................... G06T 15/40 345/422 |
| 2010/0149176 | A1 | 6/2010 | Chang et al. |
| 2011/0279749 | A1 | 11/2011 | Erinjippurath et al. |
| 2013/0176704 | A1 | 7/2013 | Lanman et al. |
| 2014/0111712 | A1 | 4/2014 | Wu |
| 2015/0077443 | A1 | 3/2015 | Tai et al. |
| 2017/0330368 | A1 | 11/2017 | Bell et al. |
| 2019/0221176 | A1* | 7/2019 | Emslie ................. G09G 3/3413 |

FOREIGN PATENT DOCUMENTS

| | | |
|---|---|---|
| KR | 10-0923348 B1 | 10/2009 |
| KR | 10-2014-0064188 A | 5/2014 |
| KR | 20140064188 A * | 5/2014 |

OTHER PUBLICATIONS

Gordon Wetzsten et al., "Layered 3D: Tomographic Image Synthesis for Attenuation-based Light Field and High Dynamic Range Displays", Siggraph, 2011, 11 pages total.

Gordon Wetzstein et al., "Tensor Displays: Compressive Light Field Synthesis using Multilayer Displays with Directional Backlighting" Siggraph, 2012, 11 pages total.

Shizheng Wang et al., "Quality of experience measurement for light field 3D displays on multilayer LDCs", Journal of the SID, Dec. 6, 2016, vol. 24, No. 12, pp. 726-740 (15 pages total).

Communication dated Apr. 1, 2021, issued by the International Searching Authority in counterpart International Application No. PCT/KR2020/017943 (PCT/ISA/210 and 237).

Communication dated May 11, 2022, issued by the European Patent Office in counterpart European Application No. 20900219.5.

* cited by examiner

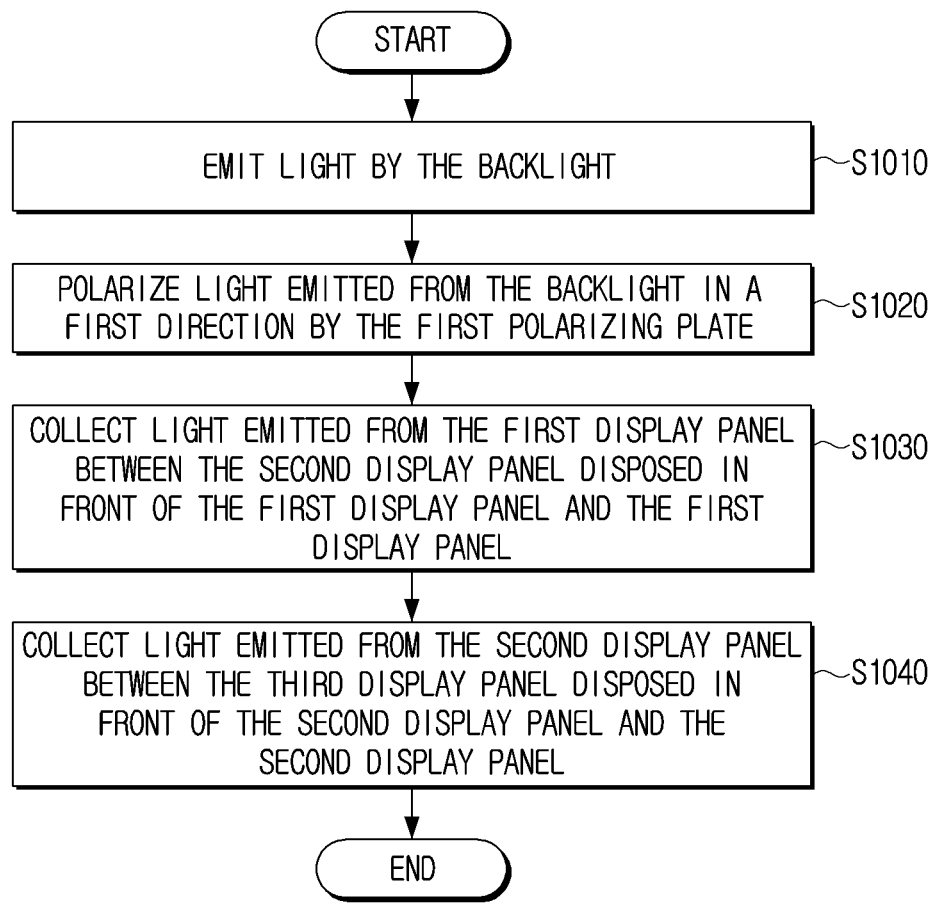

DISPLAY APPARATUS INCLUDING A PLURALITY OF DISPLAY PANELS, AND METHOD OF CONTROLLING THEREOF

CROSS-REFERENCE TO RELATED APPLICATION(S)

This application is based on and claims priority under 35 U.S.C. § 119(a) to Korean Patent Application No. 10-2019-0164093, filed on Dec. 10, 2019, in the Korean Intellectual Property Office and Korean Patent Application No. 10-2020-0158868, filed on Nov. 24, 2020, in the Korean Intellectual Property Office, the disclosures of which are incorporated by reference herein in their entireties.

BACKGROUND

1. Field

The disclosure relates to a display apparatus and a method of controlling thereof. More particularly, the disclosure relates to an electronic apparatus including a plurality of display panels and a method of controlling thereof.

2. Description of Related Art

Due to the development of electronic technologies, various types of electronic devices are being developed and provided. In particular, various types of display apparatuses that provide 3D effects to users in providing content have been developed and provided.

Although display apparatuses adopting various types of glasses-free 3D methods have been distributed to users, the related glasses-free 3D method has a problem of providing a relatively dark screen to users due to low light transmittance. In addition, because a color reproduction range is low, users who watch 3D contents are not satisfied with the related method.

There has been a demand for a glasses-free 3D technology for providing users with content having high light transmittance and high color reproduction range.

SUMMARY

Embodiments provide a display apparatus that provides a bright 3D screen to the user by increasing a light transmittance, and a method of controlling thereof.

According to an embodiment of the disclosure, a display apparatus includes a backlight configured to emit light; a first polarizing plate, disposed in front of the backlight, configured to polarize light emitted from the backlight in a first direction; and a plurality of display panels sequentially disposed in front of the first polarizing plate, wherein each of the plurality of display panels is configured to include a liquid crystal panel and a color filter disposed in front of the liquid crystal panel, and wherein a display panel disposed at a farthest distance from the first polarizing plate from among the plurality of display panels is configured to include a second polarizing plate that polarizes the light of the first direction in a second direction.

The plurality of display panels include first to third display panels sequentially disposed, wherein the light emitted from the first display panel is incident on the second display panel, and wherein the light emitted from the second display panel is incident on the third display panel.

The display apparatus may further include a processor configured to display an image using the first display panel, the second display panel and the third display panel. A first light collected between the second display panel and the first display panel, and a second light collected between the third display panel and the second display panel may correspond to different depths of an image signal, respectively.

The image may include a first image, a second image and a third image, the processor may be configured to control the first display panel to display the first image, the second display panel to display the second image and the third display panel to display the third image, respectively, and corresponding pixels of the first image, the second image and the third image may have different grayscale values.

The display apparatus may further include a memory configured to store attenuation information by grayscale for each of the first display panel, the second display panel and the third display panel, and the processor may be configured to determine a grayscale value by pixel for each of the first image, the second image and the third image based on the attenuation information corresponding to the grayscale indicated by the image signal.

The processor may be configured to adjust an intensity of the light emitted from the backlight based on a grayscale value for each of the first image, the second image and the third image, light transmittance of the first polarizing plate and the second polarizing plate of each of the plurality of display panels, and light transmittance of the color filter.

The backlight may include a self-luminous white element.

The backlight may include a self-luminous red element, a self-luminous green element and a self-luminous blue element, and the backlight may be configured to generate the light by simultaneously driving the self-luminous red element, the self-luminous green element and the self-luminous blue element.

The plurality of display panels may include the first to third display panels sequentially disposed, any one or any combination of the first display panel and the second display panel may include a color filter, and the third display panel may not include a color filter.

According to an embodiment of the disclosure, a method of controlling a display apparatus includes: emitting light by a backlight; polarizing light emitted from the backlight in a first direction by the first polarizing plate; collecting light emitted from a first display panel between a second display panel disposed in front of the first display panel and the first display panel; and collecting light emitted from the second display panel between a third display panel disposed in front of the second display panel and the second display panel, wherein one of the first to third display panels is configured to include a color filter disposed in front of a liquid crystal panel, wherein a display panel disposed at a farthest distance from the first polarizing plate from among the plurality of display panels is configured to include a second polarizing plate that polarizes the light of the first direction in a second direction.

The method may further include: displaying an image using the first display panel, the second display panel and the third display panel. A first light collected between the second display panel and the first display panel, and a second light collected between the third display panel and the second display panel may correspond to different depths of an image signal, respectively.

The displaying may include displaying a first image on the first display panel; displaying a second image on the second display panel; and displaying a third image on the first to third display panels. Corresponding pixels of the first image, the second image and the third image may have different grayscale values.

The display apparatus may include a memory storing attenuation information by grayscale for each of the first display panel, the second display panel and the third display panel, and the method may further include determining a grayscale value by pixel for each of the first image, the second image and the third image based on the attenuation information corresponding to the grayscale indicated by the image signal.

The method may further include adjusting an intensity of the light emitted from the backlight based on a grayscale value for each of the first image, the second image and the third image, light transmittance of the first polarizing plate and the second polarizing plates, and light transmittance of the color filter.

The emitting the light may include controlling a self-luminous white element to emit the light.

The emitting the light may include controlling a self-luminous red element, a self-luminous green element and a self-luminous blue element to emit light simultaneously.

Any one or any combination of the first display panel and the second display panel may include a color filter, and a third display panel of the display apparatus may not include a color filter.

According to an embodiment of the disclosure a display apparatus includes: a backlight; a first polarizing plate disposed on the backlight; a first display panel disposed on the first polarizing plate, the first display panel including a first panel polarizing plate and a first panel liquid crystal panel; and a second display panel disposed on the first display panel, the second display panel including second panel polarizing plate and a second panel liquid crystal panel. A color filter is interposed between the first panel polarizing plate and the first panel liquid crystal panel or the second panel polarizing plate and the second panel liquid crystal panel, and either the first panel polarizing plate is disposed directly on the first panel liquid crystal panel or the second panel polarizing plate is disposed directly on the second panel liquid crystal panel.

The color filter may be interposed between the first panel polarizing plate and the first panel liquid crystal panel, and the second panel polarizing plate may be disposed directly on the second panel liquid crystal panel.

The second display panel may not include a color filter.

The color filter may be interposed between the second panel polarizing plate and the second panel liquid crystal panel, and the first panel polarizing plate may be disposed directly on the first panel liquid crystal panel.

The first display panel may not include a color filter.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 10 is a flowchart illustrating a method of controlling a display apparatus according to an embodiment.

DETAILED DESCRIPTION

Terms used herein will be briefly explained, and embodiments will be described in greater detail with reference to the accompanying drawings.

Terms used in the disclosure are selected as general terminologies currently widely used in consideration of the configuration and functions, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents.

The embodiments may vary, and may be provided in different embodiments. Various embodiments will be described with reference to accompanying drawings. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist, the specific description is omitted.

As used herein, the terms such as "1st" or "first" and "2nd" or "second," may use corresponding components regardless of importance or order and are used to distinguish a component from another without limiting the components.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Embodiments will be described in greater detail below in a manner that will be understood by one of ordinary skill in the art. However, embodiments may be realized in a variety of different configurations, and not limited to descriptions provided herein. Also, well-known functions or constructions are not described in detail because they would obscure the disclosure with unnecessary detail.

Figure 1:
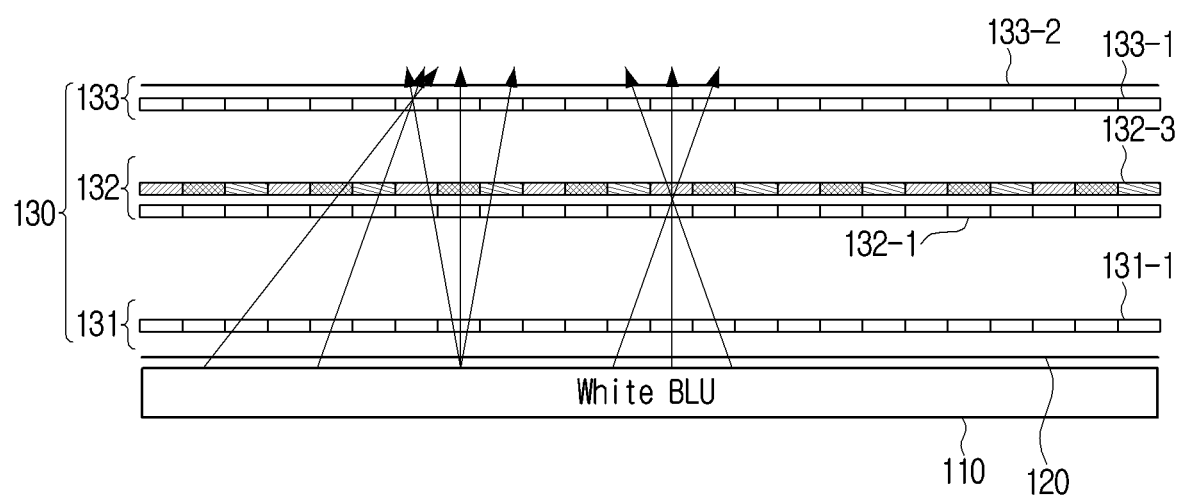
FIG. 1 is a view illustrating a configuration of a display apparatus according to an embodiment.

FIG. 1 is a view illustrating a configuration of a display apparatus according to an embodiment;

Referring to FIG. 1, the display apparatus 100 according to an embodiment may include a backlight 110, a first polarizing plate 120, and a plurality of display panels 130.

The display apparatus 100 displays an image. The display apparatus 100 may be implemented as a television (TV), but is not limited thereto, and may be applied to devices having a display function such as a video wall, a large format display (LFD), a digital signage, a digital information display (DID), a projector display, or the like. The display apparatus 100 may be realized as various kinds of displays, such as liquid crystal display (LCD), organic light-emitting diode (OLED), liquid crystal on silicon (LCoS), digital light processing (DLP), a quantum dot (QD) display panel, and quantum dot light-emitting diodes (QLED), or the like.

The display apparatus 100 according to an embodiment may include a backlight 110. The backlight 110 includes a light source, a light guide plate, and at least one optical sheet, and the backlight 110 may provide light to the plurality of display panels 130.

The plurality of display panels 130 according to an embodiment may be implemented as a liquid crystal display panel. A liquid crystal panel is a display panel implemented with a liquid crystal element, which is a display element using a liquid crystal capable of electrically controlling a transmittance of light.

Because the liquid crystal panel is implemented as a liquid crystal device that does not emit light by itself, the backlight 110 is provided for the liquid crystal panel to implement an image. The backlight 110 serves to evenly distribute light so that the display panels are evenly illuminated and the display image can be seen. In general, a cathode fluorescent lamp (CCFL) backlight and a light emitting diode (LED) backlight which generates a small amount of heat may be used. The backlight 110 according to an embodiment may be implemented as an edge type backlight or a direct type backlight. The edge type backlight is disposed on one side of the light guide plate, and the direct type backlight may be disposed below the light guide plate to be implemented.

The backlight 110 may emit monochromatic light (light of a specific wavelength) when power is supplied. According to an embodiment, the backlight 110 may emit white light.

The display apparatus 100 according to an embodiment may include a first polarizing plate 120 disposed on a front side of the backlight 110 to polarize light emitted from the backlight 110 in a first direction.

The display apparatus 100 may include a plurality of display panels 130 sequentially spaced apart from the first polarizing plate 120. The first polarizing plate 120 may be interposed between the backlight 110 and the plurality of display panels 130. Each of the plurality of display panels 130 may include a liquid crystal panel.

According to an embodiment, the liquid crystal panel included in each of the plurality of display panels 130 may have liquid crystals injected between two glass plates, and the injected liquid crystals may allow light to pass through in vertical alignment and horizontal twisting alignments through control of a thin film transistor, and the light may be irradiated on the entire surface of the display panel 130.

In addition, among the plurality of display panels 130, a display panel disposed at the farthest distance from the first polarizing plate 120 may include a second polarizing plate 133-2 polarizing light of a first direction in a second direction. Referring to FIG. 1, the second polarizing plate 133-2 included in the third display panel 133 is disposed on the front surface of the liquid crystal panel 133-1, and polarize light passing through the liquid crystal panel 133 of the third display panel 133 in the second direction. The first polarizing plate 120 and the second polarizing plate 133-2 may pre-polarize light emitted through the backlight 110.

LCD panels are classified into twisted nematic (TN) panels, in-plane switching (IPS) panels, vertical alignment (VA) panels, or the like according to a driving method of liquid crystals.

The TN panel operates such that a black screen is output by blocking light when the liquid crystal molecules become vertical while power is supplied, and when a maximum voltage is applied, and the IPS panel uses a method of rotating the liquid crystal molecules by using a magnetic field which used to be in a horizontal direction. The VA panel operates in a way that the liquid crystal molecules are positioned vertically when the power is not turned on, and the liquid crystal molecules are operated horizontally to pass light when the power is turned on.

One of the plurality of display panels 130 according to an embodiment may include a color filter disposed in front of the liquid crystal panel. Referring to FIG. 1, one display panel 130 including the color filter among the plurality of display panels 130 may operate in a method that the white light that has passed through the liquid crystal panel passes through the color filter and is scanned across the front surface. The display apparatus 100 according to an embodiment may minimize attenuation of an intensity of light due to the color filter because not all of the plurality of display panels 130 include the color filter, but only one display panel 130 includes the color filter. For example, because a light transmittance of the color filter is about 33%, the light transmittance decreases when each of the plurality of display panels 130 includes the color filter. When one display panel 130 includes the color filter, the light intensity is transmitted by about 67%, whereas when all of the first to third display panels 131, 132, and 133 include the color filters, there is a problem in that the intensity (or light efficiency) of light reaching the front surface of the display apparatus 100, among the white light emitted by the backlight 110, is rapidly reduced, because the light transmittance is about 3.6% (0.33*0.33*0.33*100). The light intensity is attenuated by about 96.4%. A transmittance rate and an attenuation rate of light intensity (or light efficiency) due to other components provided in the display apparatus 100 such as the first polarizing plate 120, the liquid crystal panel, the second polarizing plate, or the like are not described for convenience of description.

Only one display panel 130 includes the color filter as an embodiment, and the display apparatus 100 may variously implement such that at least one display panel among the plurality of display panels 130 does not include the color filter.

The color filter includes a plurality of pixels so as to correspond to the liquid crystal panel, and each pixel may be formed of a plurality of sub-pixels. For example, each pixel may include three sub-pixels corresponding to a plurality of light colors, for example, red, green, and blue light colors. However, embodiments are not limited thereto, and in some cases, cyan, magenta, yellow, black, or other subpixels may be included in addition to the red, green, and blue subpixels. In other words, each sub-pixel may be implemented in a form including a liquid crystal element (liquid crystal molecule) and a color filter that transmits light corresponding to each sub-pixel.

Referring to FIG. 1, the display apparatus 100 according to an embodiment may include first to third display panels 131, 132, and 133, and the first to third display panels 131, 132, and 133 may be sequentially spaced apart on the front surface of the first polarizing plate 120. Also, only one of the first to third display panels 131, 132, and 133 may include the color filter. FIG. 1 illustrates that the second display panel 132 includes the color filter 132-3 disposed in front of the liquid crystal panel 132-1, but is not limited thereto. For example, the first display panel 131 may include the color filter disposed in front of the liquid crystal panel 131-1, and the third display panel 133 may include a color filter disposed in front of liquid crystal panel 133-1.

FIG. 1 illustrates that the display apparatus 100 includes a plurality of display panels 130, and that the plurality of display panels includes the first to third display panels 131, 132, and 133, but is not limited thereto. The plurality of display panels 130 may include at least two or more display panels. For example, the plurality of display panels 130 may include four or more display panels sequentially spaced apart from each other. Hereinafter, it will be described that the plurality of display panels 130 includes the first to third display panels 131, 132, and 133 for convenience of description.

The display apparatus 100 according to an embodiment may display an image through each of the plurality of display panels 130 to provide a 3D image. For example, the display apparatus 100 controls each of the first to third display panels 131, 132, and 133 to display first to third images.

The display apparatus 100 according to an embodiment may provide an image having depth, i.e., a 3D image, by overlapping the first to third images, and generate collected light similar to an existence of an image point at intervals between the plurality of display panels 130. In other words, the display apparatus 100 according to various embodiments may provide a 3D image by appears to have depth. A detailed description of this will be described with reference to FIG. 2.

Figure 2:
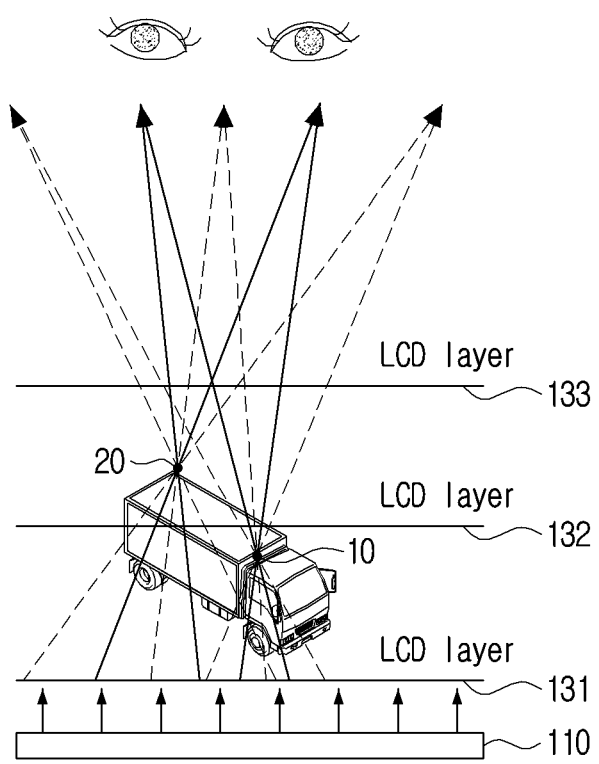
FIG. 2 is a view illustrating a path of light according to an embodiment.

FIG. 2 is a view illustrating a path of light according to an embodiment.

Referring to FIG. 2, white light emitted by the backlight 110 according to an embodiment may be polarized and diffracted, and may interfere with each other due to the first through third display panels, or the like, and be collected at intervals between the plurality of display panels 130. A plurality of lights collected at a distance between the plurality of display panels 130 may correspond to image signals of different depths, respectively.

White light emitted by the backlight 110 according to an embodiment may pass through the first polarizing plate 120 and may be linearly polarized in a first direction. For example, the light in the first direction that has passed through the first polarizing plate 120 may vibrate in a specific axis (e.g., an X axis or a Y axis). Subsequently, the light in the first direction may pass through the first display panel 131 disposed in front of the first polarizing plate 120. Light emitted from the first display panel 131 may be collected between the second display panel 132 disposed in front of the first display panel 131 and the first display panel 131. According to an embodiment, the first light 10 collected between the second display panel 132 and the first display panel 131 may correspond to a first depth of an image.

The light emitted from the second display panel 132 may be collected between the third display panel 133 disposed in front of the second display panel 132, and the second display panel 132. According to an embodiment, the second light 20 collected between the third display panel 133 and the second display panel 132 may correspond to a second depth of an image.

Because each of the first light 10 and the second light 20 represents different depths of an image, the display apparatus 100 may provide a 3D image including a plurality of depths to the user. For example, based on a location of both eyes of the user, the first light 10 is collected at a position relatively farther than the second light 20, such that the first light 10 may represent objects which are far away in the image, compared to the second light 20.

The display apparatus 100 according to another embodiment may provide an image or an object included in the image using a point cloud method. The point cloud method is a method of generating an image using a plurality of points existing on an object surface, and an object may be assumed to be an aggregate of a plurality of points. The display apparatus 100 may control the plurality of display panels 130 such that a plurality of light is collected at intervals between the plurality of display panels 130 based on the image signal. A plurality of lights collected at intervals between the plurality of display panels 130 may correspond to a plurality of points existing on the object surface. The object may generally be a three-dimensional object, but it is not necessarily limited thereto, and may be various types of objects that can be expressed in 3D.

For convenience of description, although only the first light 10 collected at the interval between the first and second display panels 131 and 132, and the second light collected at the interval between the second and third display panels 132 and 133 are illustrated in FIG. 2, a plurality of light is collected at intervals between the plurality of display panels 130 according to a resolution of an image, a size of the image, a depth included in an image signal or the like. In addition, each of the plurality of lights may correspond to different depths included in the image signal or may correspond to a plurality of points constituting an object included in the image.

The display apparatus 100 according to an embodiment may include a processor that controls the overall operation of the display apparatus 100.

According to an embodiment, the processor may be implemented as a digital signal processor (DSP), a microprocessor, or a time controller (TCON), but is not limited thereto, and may include one or more of a central processing unit (CPU), microcontroller unit (MCU), micro processing unit (MPU), controller, application processor (AP), graphics-processing unit (GPU), or communication processor (CP), ARM processor, or may be defined by a corresponding term. In addition, the processor may be implemented with a system on chip (SoC) or large scale integration (LSI) with a built-in processing algorithm, or a field programmable gate array (FPGA). The processor may perform various functions by executing computer executable instructions stored in memory.

The processor drives the backlight 110 to provide white light to the plurality of display panels 130. Specifically, the processor may adjust any one or any combination of a supply time and intensity of a driving current (or driving voltage) supplied to the backlight 110. Specifically, the processor may control a luminance of the light sources included in the backlight 110 by pulse width modulation (PWM) with a variable duty ratio, or control a luminance of the light sources of the backlight 110 by varying a current intensity. The PWM controls a ratio of turning on and off of the light sources, and the duty ratio % is determined according to a dimming value input from the processor.

In this case, the processor may be implemented in a form including a driver IC for driving the backlight 110. For example, the processor may be implemented as a digital signal processor (DSP), and may be implemented as a digital driver integrated circuit (IC) and may be formed on one chip. However, the driver IC may be implemented as hardware separate from the processor. For example, when the light sources included in the backlight 110 are implemented as LED elements, the driver IC may be implemented as at least one LED driver that controls a current applied to the LED elements. According to an embodiment, the LED driver may be disposed at a rear end of a power supply (e.g., a switching mode power supply (SMPS)) to receive a voltage from the power supply. However, according to another embodiment, a voltage may be applied from a separate power supply device. Alternatively, the SMPS and the LED driver may be implemented in a single integrated module.

In particular, the processor according to an embodiment may display an image on each of the plurality of display panels 130. For example, the processor may display first to third images on each of the first to third display panels 131, 132, and 133. Grayscale values corresponding to the same pixel position in each of the first to third images may be different from each other. A detailed description regarding this will be provided in FIG. 3.

Figure 3:
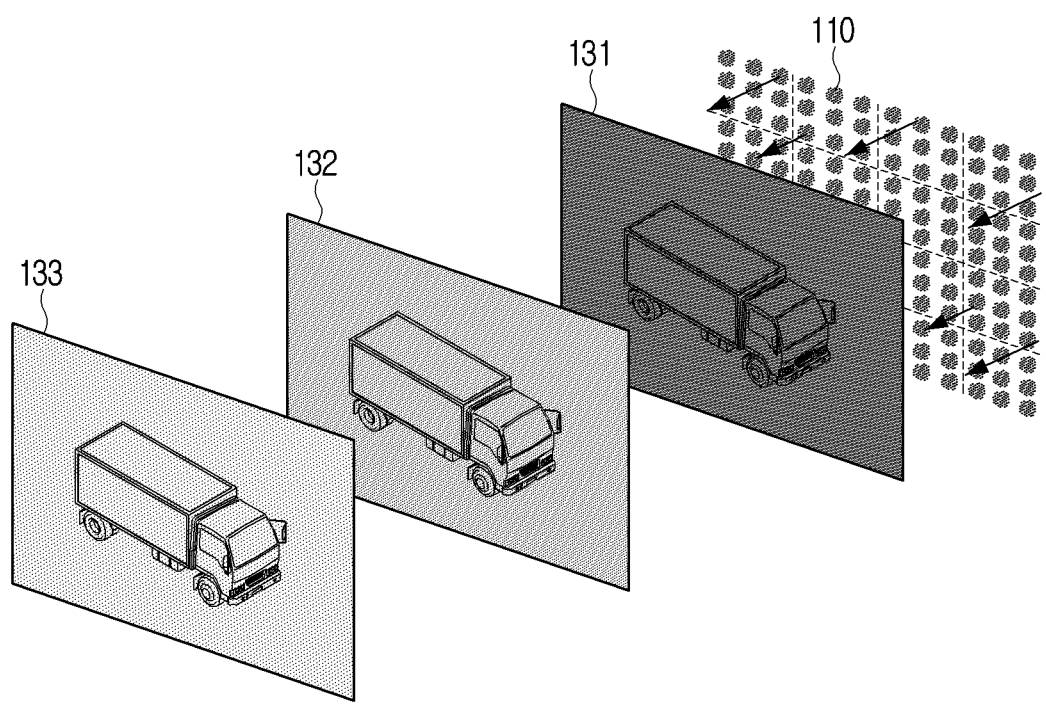
FIG. 3 is a view illustrating a display panel and an image according to an embodiment.

FIG. 3 is a view illustrating a display panel and an image according to an embodiment.

Referring to FIG. 3, a first display panel 131 disposed in front of the backlight 110, a second display panel 132 disposed in front of the first display panel 131, and a third display panel disposed in front of the second display panel 132 may display different images, respectively. Each of the plurality of images may be images which are different only in their grayscale values.

For example, the processor may display the same image on the first display panel 131, the second display panel 132 and the third display panel 133 based on an image signal. However, a grayscale value corresponding to a pixel at the same location of the first image displayed on the first display panel 131 and the second image displayed on the second display panel 132 may be different from each other. In addition, the second image displayed on the second display panel 132 and the grayscale value corresponding to the pixel at the same location of the third image displayed on the third display panel 133 may be different from each other.

The display apparatus 100 may display each of the first to third images as grayscale values different from each other on the corresponding pixel in order that the first to third images are overlapped such that a grayscale value corresponding to each of a plurality of pixels included in an image provided to the user has a grayscale value corresponding to each of the plurality of pixels according to an image signal. A detailed description regarding this will be provided with reference to FIG. 4.

Figure 4:
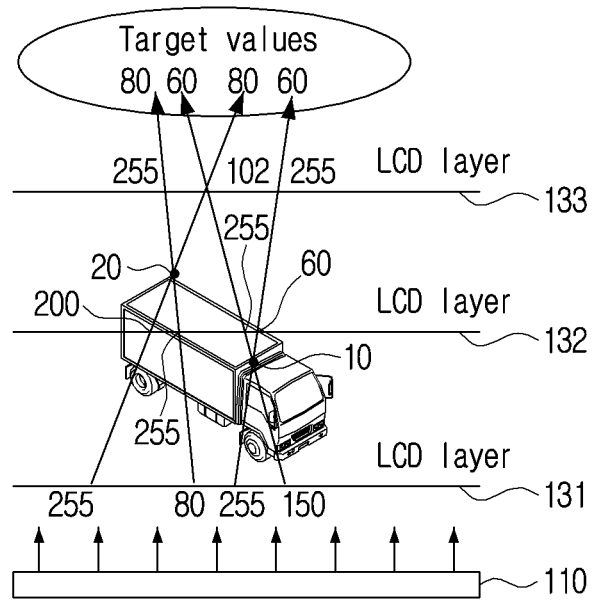
FIG. 4 is a view illustrating a grayscale value according to an embodiment.

FIG. 4 is a view illustrating a grayscale value according to an embodiment.

Referring to FIG. 4, the display apparatus 100 according to an embodiment may control each of the first to third display panels 131, 132, and 133 to display different images. Because the first image displayed on the first display panel 131, the second image displayed on the second display panel 132, and the third image displayed on the third display panel 133 are overlapped, the display apparatus 100 may provide a 3D image representing a plurality of depths to the user located in front of the display apparatus 100.

The display apparatus 100 may identify a grayscale value of a pixel based on an image signal.

The display apparatus 100 may identify grayscale values of each of the plurality of pixels based on an image signal in order to display an image based on an image signal received from an external source. The display apparatus 100 may provide the first to third images such that a grayscale value of each of a plurality of pixels included in a final image (e.g., a 3D image) provided to the user by overlapping the first to third images corresponds to the identified grayscale value based on the image signal.

According to an embodiment, the display apparatus 100 according to an embodiment may include a memory in which brightness attenuation information for each of the first to third display panels 131, 132, and 133 for each grayscale is stored. The display apparatus 100 may determine a grayscale value for each pixel of each of the first to third images based on brightness attenuation information for each grayscale. The brightness attenuation information may include information on an intensity of light attenuated when light passes through the plurality of display panels 130. In addition, the brightness attenuation information may include information on each path of a plurality of light rays emitted from the backlight 110.

According to an embodiment, the intensity of light emitted from the backlight 110 may be attenuated according to grayscale values of each of the plurality of display panels 130 while passing through the plurality of display panels 130.

For example, a grayscale value ranging from 0 to 254 may refer to blocking of light, and a grayscale value of 255 may refer to passing without attenuation of light. As another example, a grayscale value of 200, with reference to a range of 0 to 255, may refer to attenuation of 22% of the light intensity, and as another example, a grayscale value of 150 may refer to attenuation of 41% of the light intensity.

Referring to FIG. 4, the display apparatus 100 may identify a grayscale value (or a target value) corresponding to a first pixel among a plurality of pixels as 80 based on an image signal. In this case, the display apparatus 100 may display the first to third images on the first display panel to the third display, respectively, such that a grayscale value of the first pixel is to be 80 in an image (e.g., a 3D image) provided through overlapping the first to third images.

For example, the first display panel 131 may display a first image with a grayscale value of 80, and the second display panel 132 and the third display panel 133 may display second and third images with a grayscale value of 255, respectively. In this case, the first display panel 131 may pass light with a grayscale value of 80, and the second display panel 132 and the third display panel 133 may pass light without attenuation. The display apparatus 100 may provide a 3D image such that a grayscale value of the first pixel becomes 80 according to a path of white light emitted from the backlight 110.

As another example, the display apparatus 100 may identify a grayscale value (or a target value) corresponding to a second pixel among a plurality of pixels as 60 based on the image signal. In this case, the first display panel 131 according to an embodiment may display a first image with a grayscale value of 150, and the second display panel 132 may display a second image with a grayscale value of 255, and the third display panel 133 may display a third image with a grayscale value of 102. In this case, the first display panel 131 passes light with a grayscale value of 150, and the second display panel 132 passes light without attenuation, and the third display panel passes light with a grayscale value of 102 to attenuate the light by 40% (102/255×100), and a 3D image may be provided such that the grayscale value of the second pixel is 60.

A white light emitted from the backlight 110 includes a plurality of light rays, and FIG. 4 illustrates paths of four light rays for convenience of description. In addition, although it is illustrated that the first light 10 and the second light 20 are generated by collecting two light rays, it is described for convenience, and a plurality of light rays may be collected to generate the first light 10 and the second light 2, respectively, and the collected light may be innumerable.

Figure 5:
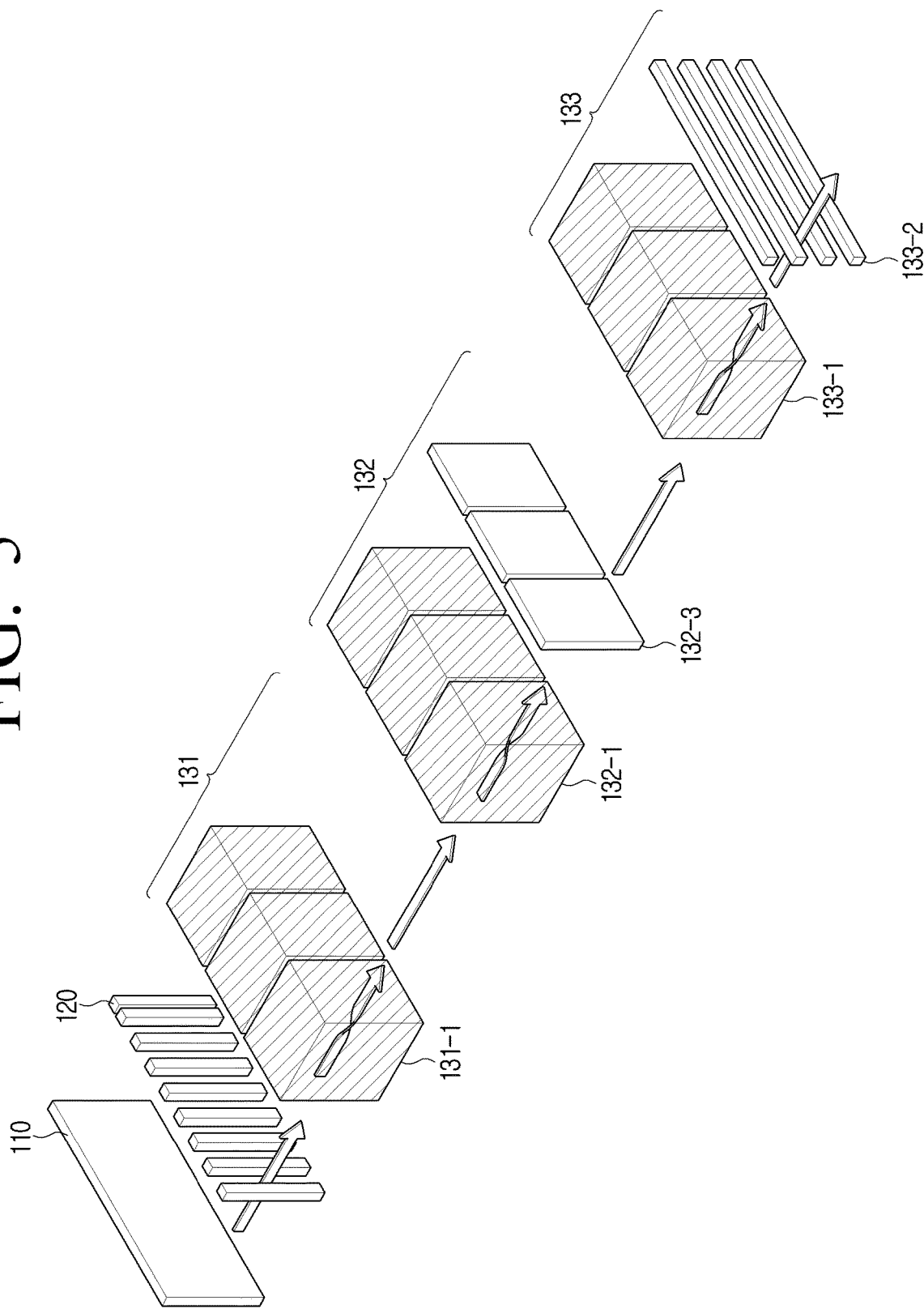
FIG. 5 is a view illustrating a plurality of display panels according to an embodiment.

FIG. 5 is a view illustrating a plurality of display panels according to an embodiment.

Referring to FIG. 5, a plurality of light rays included in white light emitted from the backlight 110 may pass through the first polarizing plate 120. The white light emitted from the backlight 110 may be attenuated when passing through the first polarizing plate 120. For example, if a transmittance of the first polarizing plate 120 is 50%, the intensity of white light may be attenuated by half.

A light passing through the first polarizing plate 120 may pass through the liquid crystal panel 131-1 provided in the first display panel 131. According to an embodiment, when a transmittance of the liquid crystal panel 131-1 is about 95%, an intensity of light of the light passing through the first polarizing plate 120 may be attenuated by about 5% when passing through the first display panel 131. In other words, the transmittance of the first display panel 131 may be about 95%.

Light that has passed through the first display panel 131 may be further attenuated when passing through the second and third display panels 132 and 133. In particular, the second display panel 132 according to an embodiment may include a color filter 132-3, and if a transmittance of the color filter 132-3 is 33%, a transmittance of the second display panel 132 may be about 31% (33% of 95% transmittance). The third display panel 133 according to an embodiment may not include a color filter, and the second polarizing plate 133-2, and a transmittance of the second polarizing plate 133-2 is about 80%, and therefore a transmittance of the third display panel 133 may be about 76%.

An intensity of light (or light efficiency) provided on the front of the display apparatus after passing through the first polarizing plate 120, the first display panel 131, the second display panel 122 and the third display panel 133 from the light emitted from the backlight 110 may be about 11.3%. For example, a transmittance of the first polarizing plate 120 may be 50%, a transmittance of the liquid crystal panel 131-1 of the first display panel 131 may be 95%, and a transmittance of the liquid crystal panel 132-1 of the second display 132 may be 95%, a transmittance of the color filter 132-3 may be 33%, a transmittance of the liquid crystal panel 133-1 of the third display panel 133 may be 95%, and a transmittance of the second polarizing plate 133-3 may be 80%. Meanwhile, the specific numbers are only examples for convenience of description. By contrast, if each of the plurality of display panels includes a color filter, a display apparatus has a problem in that a brightness of light is attenuated due to a plurality of color filters, polarizing plates, or the like, and the light intensity or light efficiency does not exceed 1.3% at most. The display apparatus 100 according to various embodiments may provide a 3D image representing a depth while minimizing attenuation of brightness. For example, a 3D image that is relatively brighter and has a higher color reproduction rate than a display apparatus adopting a high-rank 3D (HR3D) type glassless 3D image technology may be provided.

In addition, the display apparatus 100 according to an embodiment may adjust an intensity of light emitted from the backlight based on a light transmittance of the first polarizing plate 120, the second polarizing plates, and the color filter. For example, the display apparatus 100 may adjust the intensity of light emitted from the backlight 110 based on the intensity of light that is attenuated as a white light emitted from the backlight 110 passes through the first polarizing plate 120, a plurality of display panels 130, a protective glass, a color filter, or the like provided in the display apparatus 100.

Figure 6A:
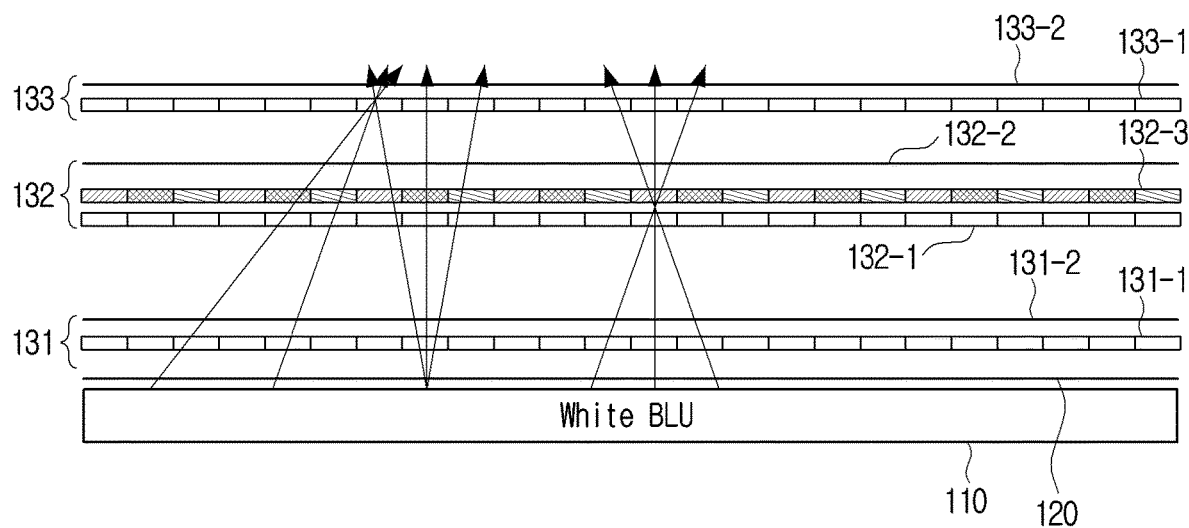
FIGS. 6A, 6B and 6C are views illustrating locations of color filters according to another embodiment.
Figure 6B:
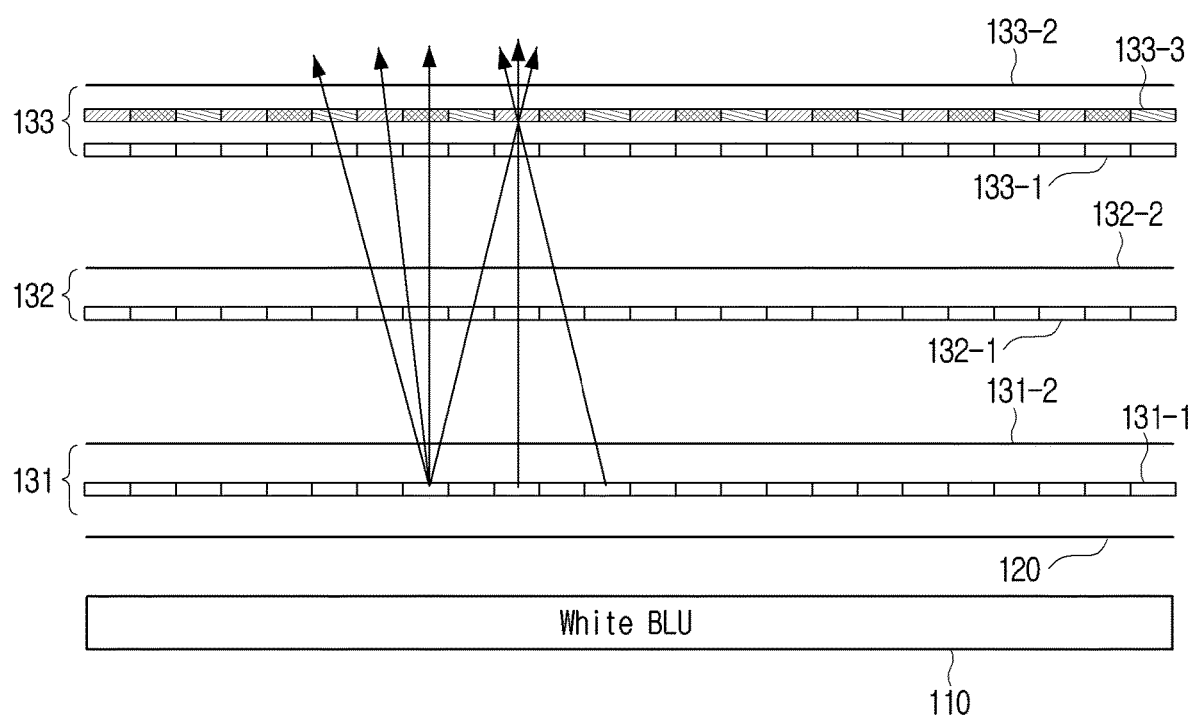
Figure 6C:
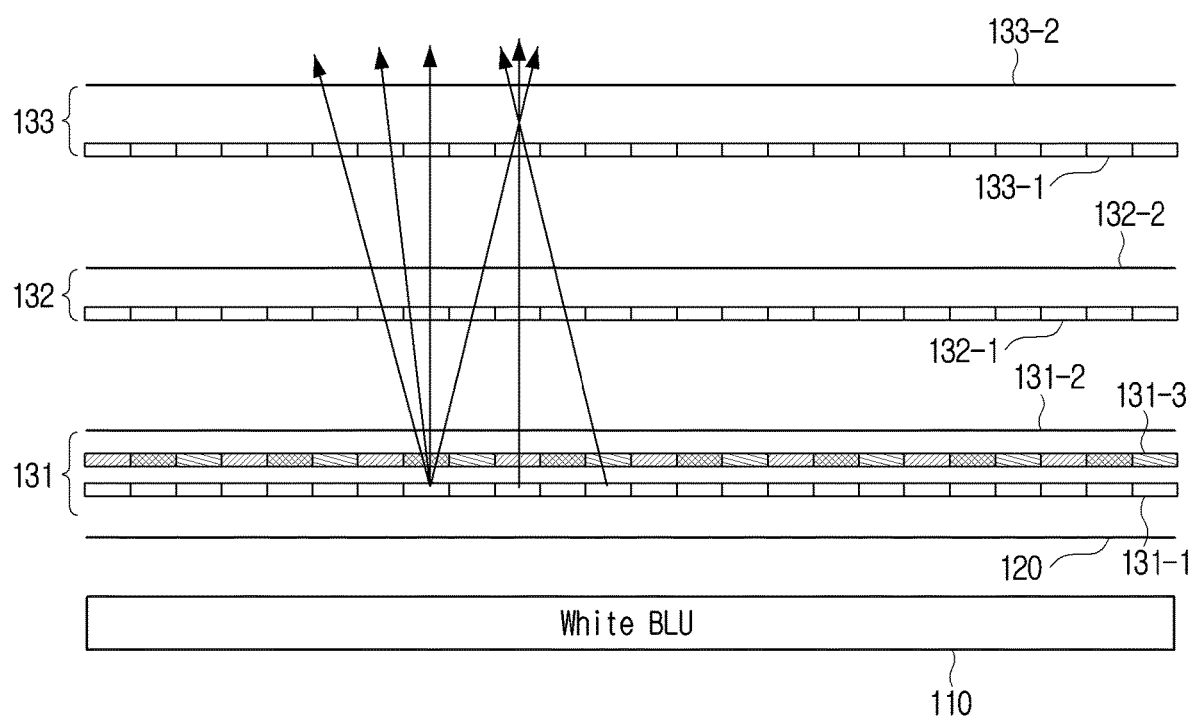

FIGS. 6A, 6B and 6C are views illustrating locations of color filters according to another embodiment.

Referring to FIGS. 6A, 6B and 6C, each of the first to third display panels 131, 132, and 133 may be implemented in a form including the second polarizing plate 133.

Referring to FIG. 6A, the display apparatus 100 according to another embodiment of the disclosure, the second display panel 132 of the first to third display panels 131, 132, and 133 may be implemented to include the color filter 132-3. In addition, each of the first to third display panels 131, 132, and 133 may be implemented in a form including the second polarizing plate 133-2.

Referring to FIG. 6B, the display apparatus 100 according to another embodiment may be implemented such that the third display panel 133 among the first to third display panels 131, 132 and 133 includes the color filter 133-3, whereas the first and second display panels 131 and 132 do not include a color filter. In this regard, the second polarizing plate 131-2 of the first display panel is disposed directly on the liquid crystal panel 131-1 of the first display panel. Moreover, the second polarizing plate 132-2 of the second display panel is disposed directly on the liquid crystal panel 132-1 of the second display panel.

As another example, referring to FIG. 6C, the display apparatus 100 may be implemented such that the first display panel 131 of the first to third display panels 131, 132, and 133 includes the color filter 131-3, whereas the second and third display panels 132 and 133 do not include a color filter. In this regard, the second polarizing plate 133-2 of the third display panel is disposed directly on the liquid crystal panel 133-1 of the third display panel. Moreover, the second polarizing plate 132-2 of the second display panel is disposed directly on the liquid crystal panel 132-1 of the second display panel. For example, The plurality of display panels 130 provided in the display apparatus 100 may include at least two display panels, and the display apparatus 100 may indicate a depth of an image signal by using light collected at intervals between the plurality of display panels 130. The color filter may be provided on any one of the plurality of display panels 130, and the display apparatus 100 may minimize a decrease in light transmittance or attenuated rate of light brightness due to the color filter.

Figure 7:
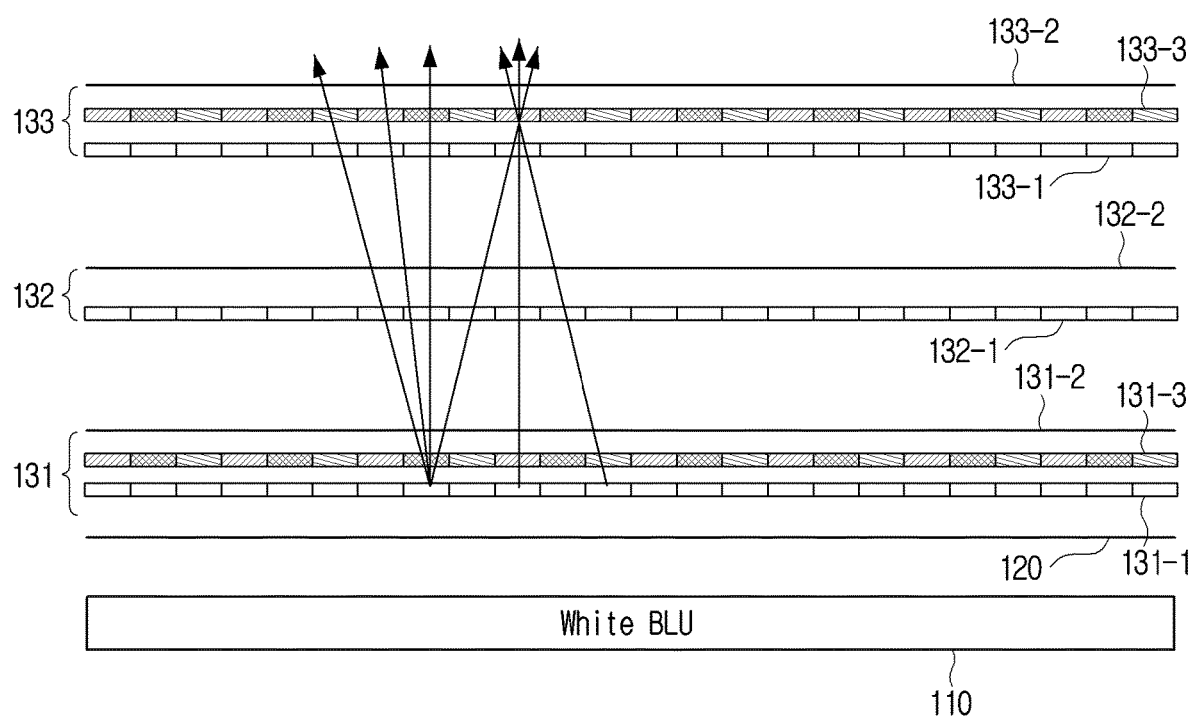
FIG. 7 is a view illustrating a plurality of color filters according to another embodiment.

FIG. 7 is a view illustrating a plurality of color filters according to another embodiment.

The display apparatus 100 according to another embodiment may include a plurality of color filters. For example, the display apparatus 100 may be implemented such that at least two of the first to third display panels 131, 132, and 133 include the color filter. In other words, at least one of the plurality of display panels 130 may not include the color filter and may be implemented as the liquid crystal panel and the second polarizing plate.

Figure 8A:
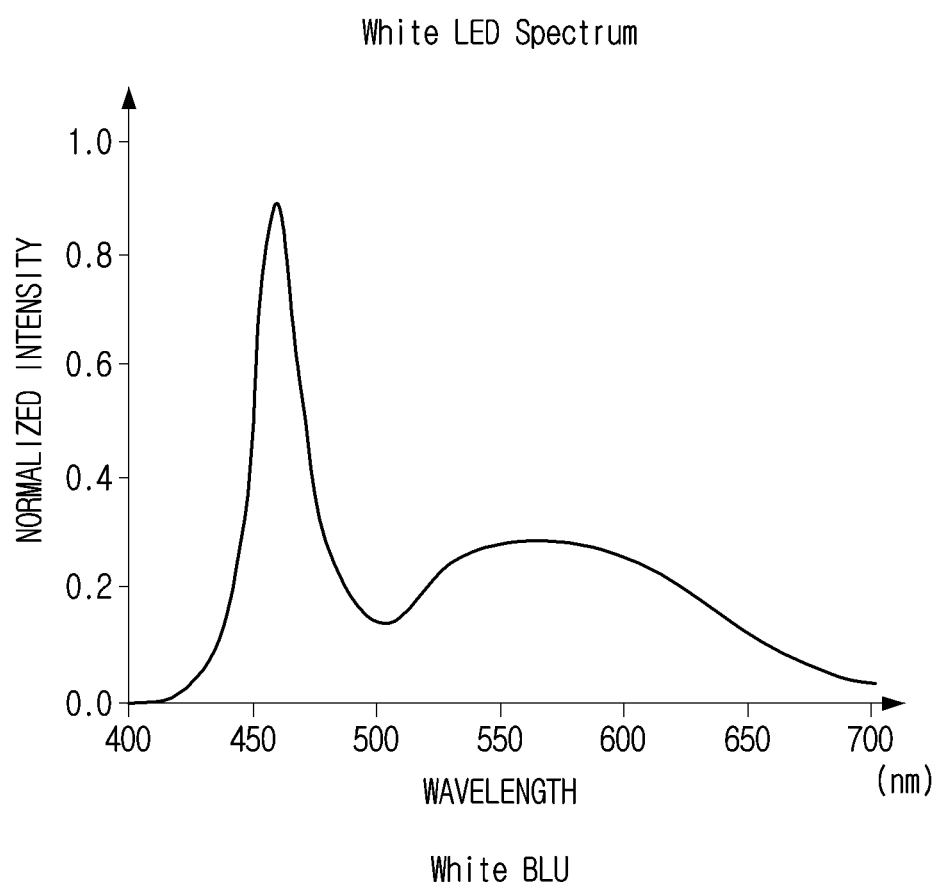
FIGS. 8A and 8B are views illustrating characteristics of backlights according to embodiments.
Figure 8B:
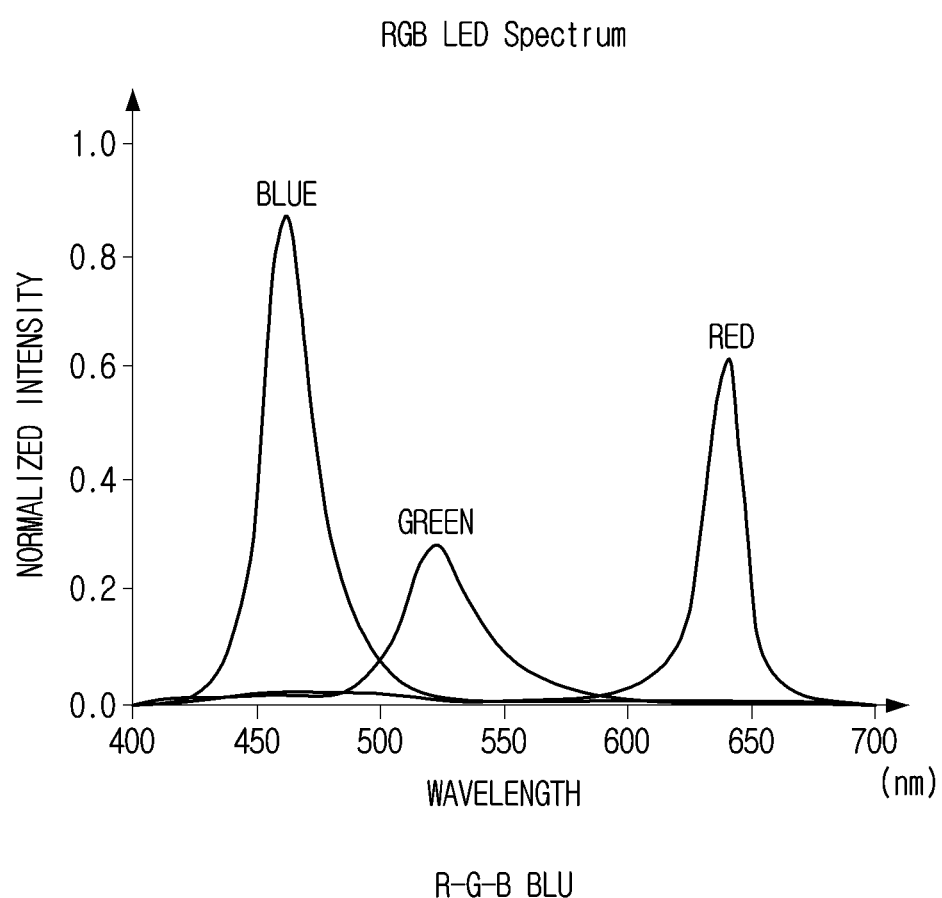

FIGS. 8A and 8B are views illustrating characteristics of backlights according to embodiments.

The backlight 110 according to an embodiment irradiates light to the plurality of display panels 130 from a rear surface of the plurality of display panels 130, that is, a surface opposite to a surface on which an image is displayed.

The backlight 110 may include a plurality of light sources, and the plurality of light sources may include a linear light source such as a lamp or a point light source such as a light emitting diode, but is not limited thereto. The backlight 110 may be implemented as a direct type backlight unit or an edge type backlight unit. The light source of the backlight may include any one or any combination of a light emitting diode (LED), hot cathode fluorescent lamp (HCFL), cold cathode fluorescent lamp (CCFL), external electrode fluorescent lamp (EEFL), ELP, FFL, or the like.

The backlight 110 according to an embodiment may include a white self-luminous element. The backlight 110 may generate white light according to light emission of the white self-luminous element. Referring to FIG. 8A, white light generated according to the light emission of the white self-luminous element may be light having a continuous intensity within a wavelength range between 400 nm to 700 nm. The self-luminous element may be implemented as an LED, an organic light emitting diode (OLED), a micro LED, or the like.

The backlight 110 according to another embodiment may include self-luminous elements of red, green, and blue. The backlight 110 may generate white light by emitting self-luminous elements of red, green, and blue at the same time.

Referring to FIG. 8B, the white light generated by light emission of self-luminous elements of red, green, and blue may have discontinuous intensity within the wavelength range between of 400 nm to 700 nm. As an example, an intensity of the white light generated by emitting light of the plurality of self-luminous elements of red, green, and blue is weaker than white light generated by emitting a single white self-luminous element have a wavelength of about 500 nm to 600 nm (less than about 0.1). Accordingly, it is possible to prevent an occurrence of color crosstalk, and a color reproduction ratio may be relatively excellent compared to a related display apparatus.

Figure 9:
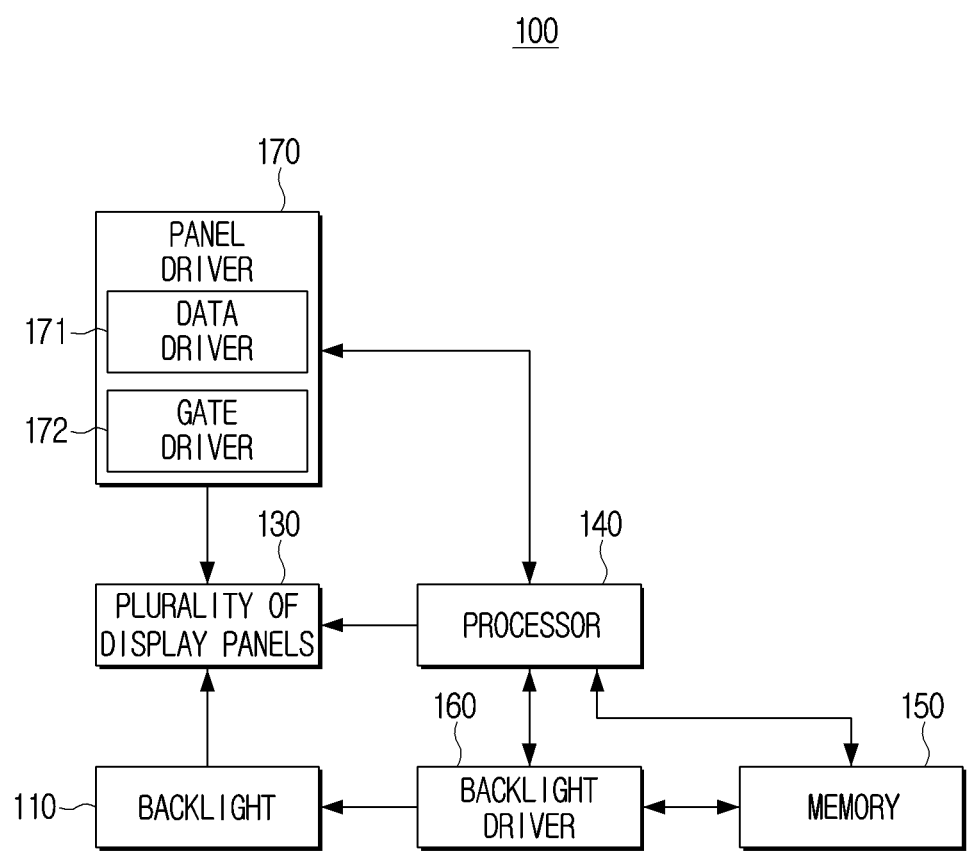
FIG. 9 is a block view illustrating a configuration of a display apparatus according to an embodiment.

FIG. 9 is a block view illustrating a configuration of a display apparatus according to an embodiment.

Referring to FIG. 9, the display apparatus 100 includes a backlight 110, a display panel 130, a processor 140, a memory 150, a backlight driver 160, and a panel driver 170.

The display panel 130 may include first to third display panels 131, 132, and 133. The processor 140 according to an embodiment may display first to third images on each of the first to third display panels 131, 132, and 133. Each of the first to third images may have different grayscale values in corresponding pixels.

The memory 150 may store various data necessary for the operation of the display apparatus 100.

In particular, the memory 150 stores data necessary for the processor 140 to perform various processes. For example, the processor 140 may be implemented as an internal memory such as ROM or RAM included in the processor 140, or may be implemented as a memory separate from the processor 140. In this case, the memory 150 may be implemented in a form of a memory embedded in the display apparatus 100 according to the purpose of storing data, or may be implemented in a form of a memory that is detachable to the display apparatus 100. For example, data for driving the display apparatus 100 may be stored in the memory embedded in the display apparatus 100, and data for an extended function of the display apparatus 100 may be stored in the memory detachable to the display apparatus 100. The memory embedded in the display apparatus 100 may be implemented in a form such as a non-volatile memory, a volatile memory, a flash memory, a hard disk drive (HDD), a solid state drive (SSD), or the like, and the memory detachable to the display apparatus 100 may be implemented in a form such as a memory card (e.g., a micro SD card, a USB memory, etc.), an external memory (e.g., a USB memory) connectable to a USB port, or the like.

According to an embodiment, the memory 150 may store brightness attenuation information by grayscale of each of a plurality of display panels. The brightness attenuation information may include information on an intensity of light attenuated when light passes through the display panel 130. In addition, the brightness attenuation information may include information on paths of each of a plurality of light rays emitted from the backlight 110.

According to another embodiment, information may not be stored in the memory 150 and may be obtained from an external device. For example, some information may be received in real time from an external device such as a set-top box, an external server, a user terminal, or the like.

The backlight driver 160 may be implemented in a form including a driver IC for driving the backlight 110. According to an example, the driver IC may be implemented as hardware separate from the processor 140. For example, when light sources included in the backlight 110 are implemented as LED devices, the driver IC may be implemented as at least one LED driver that controls a current applied to the LED devices. According to an embodiment, the LED driver may be disposed at a rear end of a power supply (e.g., a switching mode power supply (SMPS)) to receive a voltage from the power supply. However, according to another embodiment, the LED driver may receive a voltage from a separate power supply device. Alternatively, the SMPS and the LED driver may be implemented in a single integrated module.

The panel driver 170 may be implemented in a form including the driver IC for driving a plurality of display panels 130. According to an example, the driver IC may be implemented as hardware separate from the processor 140. For example, the panel driver 170 may include a data driver 171 that supplies video data to data lines and a gate driver 172 that supplies scan pulses to gate lines.

The data driver 171 generates a data signal, and generates a data signal by receiving image data of an R/G/B component from the processor 140 (or a timing controller (not shown)). In addition, the data driver 131 may be connected to data lines of the plurality of display panels to apply generated data signals to the plurality of display panels 130. Data signals applied by the data driver 171 to each of the plurality of display panels 130 may be different from each other.

The gate driver 172 (or scan driver) is generates a gate signal (or scan signal) and is connected to gate lines to transmit the gate signal to the plurality of display panels 130 in a specific line. The data signal output from the data driver 171 is transmitted to a pixel to which the gate signal is transmitted.

The panel driver 170 may further include a timing controller. The timing controller 133 may receive an input signal (IS), a horizontal synchronization signal (Hsync), a vertical synchronization signal (Vsync), a main clock signal (MCLK), or the like, from external sources such as the processor 140, generate a video data signal, a scan control signal, a data control signal, a light emission control signal, or the like, and provide the signals to the display panel 130, the data driver 171, the gate driver 172, or the like.

FIG. 10 is a flowchart illustrating a method of controlling a display apparatus according to an embodiment.

According to the method of controlling the electronic apparatus illustrated in FIG. 10, the backlight emits white light (S1010).

A first polarizing plate polarizes the light emitted from the backlight in a first direction (S1020).

Light emitted from the first display panel is collected between the second display panel disposed in front of the first display panel and the first display panel (S1030).

Light emitted from the second display panel is collected between the third display panel disposed in front of the second display panel and the second display panel (S1040).

Meanwhile, one of the first to third display panels may include a color filter disposed on the front surface of the liquid crystal panel, and among the plurality of display panels, the display panel disposed at the farthest distance from the first polarizing plate may include the second polarizing plate for polarizing light of the first direction in the second direction.

The method of controlling according to an embodiment may further include displaying an image on each of the first to third display panels, and the first light collected between the second display panel and the first display panel, and the second light collected between the third display panel and the second display panel may correspond to different depths, respectively.

In addition, the displaying may include displaying the first to third images on the first to third display panels, respectively, and each of the first to third images may have different grayscale values in corresponding pixels.

The display apparatus may store brightness attenuation information by grayscale of each of first display panel, the second display panel and the third display panel, and the controlling method according to an embodiment may further include determining grayscale value for each pixel of the first to third images based on the brightness attenuation information for each gray level.

In addition, the controlling method according to an embodiment may include adjusting an intensity of light emitted from the backlight based on grayscale values of each of the first to third images, light transmittance of the first and second polarizing plates, and light transmittance of the color filter.

The backlight according to an embodiment may include a self-luminous element of white, and may be generated according to a light emission of the self-luminous element of W.

As another example, the backlight may include self-luminous elements of red, green, and blue, and the white light may be generated as the self-luminous elements of red, green, and blue are emitted simultaneously.

A plurality of display panels according to an embodiment includes first to third display panels sequentially arranged, at least one of the first and second display panels may include a color filter, and the third display panel may not include the color filter.

Various embodiments described above may be embodied in a recording medium that may be read by a computer or a similar apparatus to the computer by using software, hardware, or a combination thereof. In some cases, the embodiments described herein may be implemented by the processor itself. In a software configuration, various embodiments described in the specification such as a procedure and a function may be embodied as separate software modules. The software modules may respectively control performance of one or more functions and operations described in the present specification.

Computer instructions for performing a processing operation of a device according to the various embodiments described above may be stored in a non-transitory computer-readable medium. When a computer instruction stored in the non-transitory computer-readable medium is executed by a processor of a specific device, the instruction lets a specific device perform a processing operation in the device according to the various embodiments described above.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing embodiments and advantages are examples and are not to be construed as limiting the present disclosure. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A display apparatus comprising:
   a backlight configured to emit light;
   a first polarizing plate, disposed in front of the backlight, configured to polarize light emitted from the backlight in a first direction;
   a plurality of display panels sequentially disposed in front of the first polarizing plate, wherein the plurality of display panels include first to third display panels sequentially disposed; and
   a processor configured to control the first display panel to display a first image, the second display panel to display a second image and the third display panel to display a third image, respectively,
   wherein corresponding pixels of the first image, the second image and the third image have different grayscale values,
   wherein each of the plurality of display panels is configured to include a liquid crystal panel,
   wherein at least one display panel of the plurality of display panels comprises a color filter disposed in front of the liquid crystal panel,
   wherein a display panel disposed at a farthest distance from the first polarizing plate from among the plurality of display panels is configured to include a second polarizing plate that polarizes the light of the first direction in a second direction, and
   wherein the processor is configured to adjust an intensity of the light emitted from the backlight based on a grayscale value for each of the first image, the second image and the third image, light transmittance of the first polarizing plate, light transmittance of the second polarizing plate, light transmittance of each of the plurality of display panels, and light transmittance of the color filter provided in each of the at least one display panel.

2. The display apparatus of claim 1, wherein the backlight comprises a self-luminous white element.

3. The display apparatus of claim 1, wherein the backlight comprises a self-luminous red element, a self-luminous green element and a self-luminous blue element, and
   wherein the backlight is configured to generate the light by simultaneously driving the self-luminous red element, the self-luminous green element and the self-luminous blue element.

4. A method of controlling a display apparatus including a backlight, a first polarizing plate disposed in front of the backlight, a plurality of display panels disposed sequentially in front of the first polarizing plate, the plurality of display panels including first to third display panels that are sequentially disposed, the method comprising:
   emitting light by the backlight;
   polarizing the light emitted from the backlight in a first direction by the first polarizing plate;

controlling the first display panel disposed in front of the first polarizing plate, among the plurality of display panels, to display a first image;

controlling the second display panel to display a second image; and controlling the third display panel to display a third image, wherein corresponding pixels of the first image, the second image and the third image have different grayscale values, wherein each of the plurality of display panels is configured to include a liquid crystal panel, wherein at least one display panel of the plurality of display panels comprises a color filter disposed in front of the liquid crystal panel, wherein a display panel disposed at a farthest distance from the first polarizing plate from among the plurality of display panels is configured to include a second polarizing plate that polarizes the light of the first direction in a second direction, and wherein the method further comprising adjusting an intensity of the light emitted from the backlight based on a grayscale value for each of the first image, the second image and the third image, light transmittance of the first polarizing plate, light transmittance of the second polarizing plate, light transmittance of each of the plurality of display panels, and light transmittance of the color filter provided in each of the at least one display panel.

5. The method of claim 4, wherein the emitting the light comprises controlling a self-luminous white element to emit the light.

6. The method of claim 4, wherein the emitting the light comprises controlling a self-luminous red element, a self-luminous green element and a self-luminous blue element to emit light simultaneously.

7. The method of claim 4, wherein the at least one display panel comprising the color filter comprises any one or any combination of the first display panel and the second display panel, and wherein a third display panel of the display apparatus does not include a color filter.

* * * * *